(12) United States Patent
Byun

(10) Patent No.: US 11,237,984 B2
(45) Date of Patent: Feb. 1, 2022

(54) MEMORY SYSTEM, MEMORY CONTROLLER AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 38 days.

(21) Appl. No.: 16/596,412

(22) Filed: Oct. 8, 2019

(65) Prior Publication Data

US 2020/0327070 A1    Oct. 15, 2020

(30) Foreign Application Priority Data

Apr. 9, 2019  (KR) .................. 10-2019-0041235

(51) Int. Cl.
  *G06F 12/126*  (2016.01)
  *G06F 12/1009*  (2016.01)
(52) U.S. Cl.
  CPC ........ *G06F 12/126* (2013.01); *G06F 12/1009* (2013.01); *G06F 2212/1016* (2013.01); *G06F 2212/304* (2013.01)
(58) Field of Classification Search
  CPC .............. G06F 12/126; G06F 12/1009; G06F 2212/1016; G06F 2212/304
  USPC ....................................................... 711/133
  See application file for complete search history.

(56) References Cited

U.S. PATENT DOCUMENTS

| | | | |
|---|---|---|---|
| 10,789,003 B1* | 9/2020 | Sun | G06F 3/0608 |
| 2009/0094391 A1* | 4/2009 | Yim | G06F 12/0804 710/57 |
| 2017/0039141 A1* | 2/2017 | Yeh | G06F 3/0656 |
| 2017/0041428 A1* | 2/2017 | Katsev | G06F 12/0813 |
| 2018/0107594 A1* | 4/2018 | Lee | G06F 12/0292 |
| 2020/0089617 A1* | 3/2020 | Onishi | G06F 12/0875 |

FOREIGN PATENT DOCUMENTS

| | | |
|---|---|---|
| KR | 10-2005-0016048 | 2/2005 |
| KR | 10-2012-0099272 | 9/2012 |
| KR | 10-2018-0114497 | 10/2018 |

* cited by examiner

*Primary Examiner* — Gautam Sain
(74) *Attorney, Agent, or Firm* — IP & T Group LLP

(57) ABSTRACT

Embodiments of the present invention relate to a memory system, a memory device, a memory controller and an operating method thereof. A partial mapping table including some of plural pieces of mapping information between physical addresses and logical addresses, which are included in a mapping table stored in the memory device, is cached, a piece of mapping information corresponding to data indicated by a command is referred to in the partial mapping table, and whether to perform an update for a reference-related parameter of the piece of mapping information is controlled depending on a size of the data, thereby improving cache efficiency for mapping informations for processing a request from a host and through this, increasing the success rate of a cache hit.

12 Claims, 15 Drawing Sheets

FIG. 6

M-TBL

| Mapping Info. (MI) | Logical Address (LA) | Physical Address (PA) |
|---|---|---|
| MI1 | LA1 | PA1 |
| MI2 | LA2 | PA2 |
| MI3 | LA3 | PA3 |
| MI4 | LA4 | PA4 |
| MI5 | LA5 | PA5 |
| MI6 | LA6 | PA6 |
| MI7 | LA7 | PA7 |
| MI8 | LA8 | PA8 |
| ... | ... | ... |

PM-TBL

| Mapping Info. (MI) | Logical Address (LA) | Physical Address (PA) | CRPF (CNT and/or ORD) |
|---|---|---|---|
| MI1 | LA1 | PA1 | CNT1 and/or ORD1 |
| MI2 | LA2 | PA2 | CNT2 and/or ORD2 |
| MI3 | LA3 | PA3 | CNT3 and/or ORD3 |
| MI4 | LA4 | PA4 | CNT4 and/or ORD4 |
| ... | ... | ... | ... |

Non-full Caching Status

FIG. 7

PM-TBL

| Mapping Info. (MI) | Logical Address (LA) | Physical Address (PA) | CRPF (CNT and/or ORD) |
|---|---|---|---|
| MI1 | LA1 | PA1 | CNT1 and/or ORD1 |
| MI2 | LA2 | PA2 | CNT2 and/or ORD2 |
| MI3 | LA3 | PA3 | CNT3 and/or ORD3 |
| MI4 | LA4 | PA4 | CNT4 and/or ORD4 |
| MI5 | LA5 | PA5 | CNT5 and/or ORD5 |

Full Caching Status

M-TBL

| Mapping Info. (MI) | Logical Address (LA) | Physical Address (PA) |
|---|---|---|
| MI1 | LA1 | PA1 |
| MI2 | LA2 | PA2 |
| MI3 | LA3 | PA3 |
| MI4 | LA4 | PA4 |
| MI5 | LA5 | PA5 |
| MI6 | LA6 | PA6 |
| MI7 | LA7 | PA7 |
| MI8 | LA8 | PA8 |
| ... | ... | ... |

FIG. 8

PM-TBL

| Mapping Info. (MI) | Logical Address (LA) | Physical Address (PA) | CRPF (CNT and/or ORD) |
|---|---|---|---|
| MI1 | LA1 | PA1 | CNT1 and/or ORD1 |
| MI2 | LA2 | PA2 | CNT2 and/or ORD2 |
| MI3 | LA3 | PA3 | CNT3 and/or ORD3 |
| MI4 | LA4 | PA4 | CNT4 and/or ORD4 |
| MI5 | LA5 | PA5 | CNT5 and/or ORD5 |

MI1/LA1/PA1 row marked as VICTIM

*Full Caching Status*

M-TBL

| Mapping Info. (MI) | Logical Address (LA) | Physical Address (PA) |
|---|---|---|
| MI1 | LA1 | PA1 |
| MI2 | LA2 | PA2 |
| MI3 | LA3 | PA3 |
| MI4 | LA4 | PA4 |
| MI5 | LA5 | PA5 |
| MI6 | LA6 | PA6 |
| MI7 | LA7 | PA7 |
| MI8 | LA8 | PA8 |
| ... | ... | ... |

FIG. 9

PM-TBL

| Mapping Info. (MI) | Logical Address (LA) | Physical Address (PA) | CRPF (CNT and/or ORD) |
|---|---|---|---|
| MI7 | LA7 | PA7 | CNT7 and/or ORD7 |
| MI2 | LA2 | PA2 | CNT2 and/or ORD2 |
| MI3 | LA3 | PA3 | CNT3 and/or ORD3 |
| MI4 | LA4 | PA4 | CNT4 and/or ORD4 |
| MI5 | LA5 | PA5 | CNT5 and/or ORD5 |

*Full Caching Status*

M-TBL

| Mapping Info. (MI) | Logical Address (LA) | Physical Address (PA) |
|---|---|---|
| MI1 | LA1 | PA1 |
| MI2 | LA2 | PA2 |
| MI3 | LA3 | PA3 |
| MI4 | LA4 | PA4 |
| MI5 | LA5 | PA5 |
| MI6 | LA6 | PA6 |
| MI7 | LA7 | PA7 |
| MI8 | LA8 | PA8 |
| ... | ... | ... |

MEMORY SYSTEM, MEMORY CONTROLLER AND OPERATING METHOD THEREOF

CROSS-REFERENCE TO RELATED APPLICATION

The present application claims priority to Korean Patent Application No. 10-2019-0041235 filed on Apr. 9, 2019, which is incorporated herein by reference in its entirety.

BACKGROUND

1. Technical Field

Various embodiments generally relate to a memory system, a memory controller and an operating method thereof.

2. Related Art

A memory system corresponding to a storage device which stores data based on a request of a host, such as a computer, a mobile device, e.g., a smartphone, a tablet, or any of various electronic devices. The memory system may include not only a device which stores data in a magnetic disk, such as a hard disk drive (HDD), but also a device which stores data in a nonvolatile memory, such as a solid state drive (SDD), a universal flash storage (UFS) device or an embedded MMC (eMMC) device.

The nonvolatile memory included in the memory system may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and/or an FRAM (ferroelectric RAM).

The memory system may further include a memory controller for controlling a memory device. The memory controller may receive a command from the host, and may perform or control an operation for reading, writing or erasing data with respect to a volatile memory or a non-volatile memory included in the memory system, based on the received command.

In the case of the conventional memory system, a problem is likely to be caused in that a request received from the host is not quickly processed due to various factors. Therefore, a method for enabling quick processing of a host request is keenly demanded in the art.

SUMMARY

Various embodiments are directed to a memory system, a memory controller and an operating method thereof, capable of enabling quick processing of a host request.

Also, various embodiments are directed to a memory system, a memory controller and an operating method thereof, capable of improving cache efficiency for mapping informations for processing of a host request.

Further, various embodiments are directed to a memory system, a memory controller and an operating method thereof, capable of achieving a high success rate of a cache hit by efficiently caching mapping informations between physical addresses and logical addresses.

In one aspect, embodiments of the disclosure may provide a memory system including: a memory device configured to store a mapping table having plural pieces of mapping information mapping between physical addresses and logical addresses; and a memory controller configured to cache a partial mapping table including some of the plural pieces of mapping information included in the mapping table.

The memory controller may refer to a first piece of mapping information corresponding to first data indicated by a first command, in the partial mapping table, and may perform an update for a reference-related parameter of the first piece of mapping information.

The memory controller may refer to a second piece of mapping information corresponding to second data indicated by a second command and having a second size different from a first size of the first data, in the partial mapping table, and may omit an update for a reference-related parameter of the second piece of mapping information.

The first size may be smaller than the second size.

For example, the first size may be equal to or smaller than a threshold value, and the second size may exceed the threshold value. According to these examples, for instance, one of the first size and the second size may be equal to the threshold value.

The reference-related parameter may include at least one of reference history information and reference count information.

When the partial mapping table is in a full caching status, the memory controller may select victim mapping information among plural pieces of mapping information included in the partial mapping table, based on reference-related parameters thereof, may erase the victim mapping information from the partial mapping table, and may cache another piece of mapping information from the mapping table in the partial mapping table.

The second piece of mapping information may be more likely to be selected as the victim mapping information than the first mapping piece information, because the update for the reference-related parameter of the second mapping information is omitted.

In another aspect, embodiments of the disclosure may provide a memory controller including: a host interface for communicating with a host; a memory interface configured to communicate with a memory device which stores a mapping table having plural pieces of mapping information mapping between physical addresses and logical addresses; a cache memory configured to cache a partial mapping table including some of the plural pieces of mapping information included in the mapping table; and a control circuit configured to control the memory device.

The control circuit may refer to a first piece of mapping information corresponding to first data indicated by a first command, in the partial mapping table, and may perform an update for a reference-related parameter of the first piece of mapping information, and may refer to a second piece of mapping information corresponding to second data indicated by a second command and having a second size different from a first size of the first data, in the partial mapping table, and may omit an update for a reference-related parameter of the second piece of mapping information.

In still another aspect, embodiments of the disclosure may provide a method of operating a memory controller including: caching a partial mapping table including some of plural pieces of mapping information mapping between physical addresses and logical addresses, which are included in a mapping table in the memory device; referring to mapping information corresponding to data indicated by a command, in the partial mapping table; and controlling an update for a reference-related parameter of the mapping information to be performed or omitted, depending on a size of the data.

In the controlling, the memory controller may perform the update for the reference-related parameter of the mapping information, when the size of the data is equal to or smaller than a first threshold value, and may omit the update for the reference-related parameter of the mapping information, when the size of the data is larger than the first threshold value.

The reference-related parameter may include at least one of reference history information and reference count information.

After the controlling, the method may further include selecting, when the partial mapping table is in a full caching status, victim mapping information among plural pieces of mapping information included in the partial mapping table, based on reference-related parameters thereof; erasing the victim mapping information in the partial mapping table; and caching another piece of mapping information from the mapping table and including and caching the new mapping information in the partial mapping table.

A possibility of mapping information to be selected as the victim mapping information may increase as the mapping information corresponds to data of a larger size.

In still another aspect, embodiments of the disclosure may provide a memory system including: a map cache configured to cache map entries, each representing a mapping relationship between one or more logical addresses and one or more physical addresses, and each having a cache replacement policy parameter (CRPF); and a controller configured to selectively update the CRPF of a cache-hit map entry among the cached map entries according to a size of data corresponding to the cache-hit map entry and evict a select cached map entry among the cached map entries from the map cache according to the CRPF.

In still another aspect, embodiments of the disclosure may provide a method of a controller for controlling a map cache configured to cache map entries, each representing a mapping relationship between one or more logical addresses and one or more physical addresses and each having a cache replacement policy parameter (CRPF).

The method may include: selectively updating the CRPF of a cache-hit map entry one among the cached map entries according to a size of data corresponding to the cache-hit map entry; and evicting a select cached map entry among the cached map entries from the map cache according to the CRPF.

Embodiments of the disclosure may provide a memory system, a memory controller and an operating method thereof, capable of enabling quick processing of a host request.

Also, embodiments of the disclosure may provide a memory system, a memory controller and an operating method thereof, capable of improving cache efficiency for mapping informations for processing of a host request.

Further, embodiments of the disclosure may provide a memory system, a memory controller and an operating method thereof, capable of achieving a high success rate of a cache hit by efficiently caching mapping informations between physical addresses and logical addresses.

BRIEF DESCRIPTION OF THE DRAWINGS

FIGS. 6 to 9 are diagrams illustrating a method for managing the partial mapping table of the memory system in accordance with an embodiment of the disclosure.

DETAILED DESCRIPTION

Figure 1:
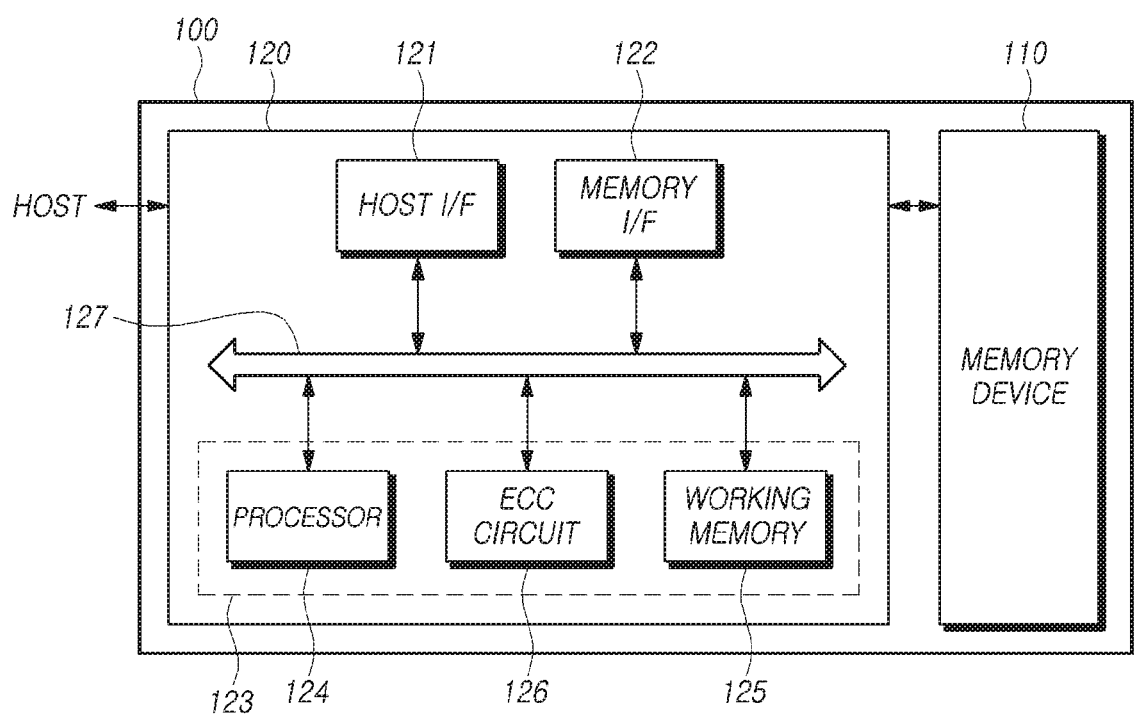
FIG. 1 is a block diagram schematically illustrating an example of a memory system in accordance with an embodiment of the disclosure.

Aspects of the disclosure are described in detail below with reference to the accompanying drawings. In the following description, the same elements are designated by the same reference numerals throughout the drawings. Further, detailed description of known functions and configurations incorporated herein are omitted when doing so may make the subject matter of the disclosure clearer. Open-ended terms, such as "comprising," "having," "including" and the like, used in the description and claims, should not be interpreted as being restricted to the specified elements or steps, unless specifically stated otherwise. Where an indefinite or definite article is used when referring to a singular noun, e.g. "a," "an," "the," this may include a plural of that noun unless specifically stated otherwise.

Also, in describing components of the disclosure, terms, such as first, second, A, B, (a), and/or (b) may be used. These are solely for the purpose of differentiating one component from another that otherwise have the same or similar names but not to imply or suggest the substance, order, sequence or number of such component.

In describing positional relationships of components, when it is described that at least two components are "connected," "coupled" or "linked," it is to be understood that the at least two components may be directly "connected," "coupled" or "linked" or may be indirectly "connected," "coupled" or "linked" with one or more other components interposed between the two components. Here, the other component(s) may be included in at least one of the at least two components which are "connected," "coupled" or "linked" with each other.

In describing time flow relationships of components, an operating method or a fabricating method, when pre and post relationships in terms of time or pre and post relationships in terms of flow are described, for example, by "after," "following," "next" or "before," such description covers non-continuous cases, unless "immediately" or "directly" is used.

In the case where a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

A memory system, a memory controller and an operating method thereof are described below with reference to the accompanying drawings through various embodiments. Throughout the specification, reference to "an embodiment," "another embodiment" or the like is not necessarily to only one embodiment, and different references to any such phrase are not necessarily to the same embodiment(s).

FIG. 1 is a block diagram schematically illustrating an example of a memory system 100 in accordance with an embodiment of the disclosure.

Referring to FIG. 1, the memory system 100 may include a memory device 110 which stores data, and a memory controller 120 which controls the memory device 110.

The memory device 110 includes a plurality of memory blocks and operates in response to the control of the memory controller 120. Operations of the memory device 110 may include, for example, a read operation, a program operation (also referred to as a write operation) and an erase operation.

The memory device 110 may include a memory cell array including a plurality of memory cells which store data. Such a memory cell array may be disposed in a memory block.

For example, the memory device 110 may be realized by a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may be realized as a three-dimensional array structure. Embodiments of the disclosure may be applied to not only a flash memory device in which a charge storage layer is configured by a conductive floating gate but also a charge trap flash (CTF) in which a charge storage layer is configured by a dielectric layer.

The memory device 110 is configured to receive a command and an address from the memory controller 120 and access a region selected by the address in the memory cell array. In other words, the memory device 110 may perform an operation corresponding to the command, for a region selected by the address.

For example, the memory device 110 may perform a program operation, a read operation and an erase operation. In the program operation, the memory device 110 may program data to a region selected by the address. In the read operation, the memory device 110 may read data from a region selected by the address. In the erase operation, the memory device 110 may erase data stored in a region selected by the address.

The memory controller 120 may control the operation of the memory device 110 according to a request of a host or in the absence of a request of the host.

For example, the memory controller 120 may control write (program), read, erase and background operations for the memory device 110. For example, the background operation may be a garbage collection (GC) operation, a wear leveling (WL) operation, a bad block management (BBM) operation, or the like.

Referring to FIG. 1, the memory controller 120 may include a host interface 121, a memory interface 122, and a control circuit 123.

The host interface 121 provides an interface for communication with the host. When receiving a command from the host, the control circuit 123 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface of the memory device 110 and the memory controller 120 in response to the control of the control circuit 123.

The control circuit 123 performs the general control operations of the memory controller 120, thereby controlling the operations of the memory device 110. To this end, for instance, the control circuit 123 may include at least one of a processor 124 and a working memory 125, and in another embodiment, may further include an error detection and correction circuit (ECC circuit) 126.

The processor 124 may control general operations of the memory controller 120, and may perform a logic calculation. The processor 124 may communicate with the host through the host interface 121, and may communicate with the memory device 110 through the memory interface 122.

The processor 124 may perform the function of a flash translation layer (FTL). The processor 124 may convert a logical block address (LBA) provided by the host 50, into a physical block address (PBA), through the flash translation layer FTL. The flash translation layer (FTL) may receive the logical block address (LBA) and convert it into the physical block address (PBA), by using a mapping table. There are various address mapping methods of the flash translation layer, depending on a mapping unit. Representative address mapping methods include a page mapping method, a block mapping method and a hybrid mapping method.

The processor 124 is configured to randomize data received from the host. For example, the processor 124 may randomize data received from the host, by using a randomizing seed. Randomized data as data to be stored is provided to the semiconductor memory device 110 and is programmed to the memory cell array.

The processor 124 is configured to derandomize data received from the semiconductor memory device 110, in a read operation. For example, the processor 124 may derandomize data received from the semiconductor memory device 110, by using a derandomizing seed. Derandomized data may be outputted to the host.

The processor 124 may control the operation of the memory controller 120 by executing firmware. In other words, in order to control general operations of the memory controller 120 and perform a logic calculation, the processor

124 may execute (drive) firmware loaded to the working memory 125 upon booting. For instance, the firmware may be stored in the memory device 110 and be loaded to the working memory 125.

The firmware as a program executed in the memory system 100 may include, for example, a flash translation layer (FTL) which performs a converting function between a logical address requested to the memory system 100 from the host and a physical address of the memory device 110, a host interface layer (HIL) which serves to analyze a command issued to the memory system 100 as a storage device from the host and transfers the command to the flash translation layer (FTL), and a flash interface layer (FIL) which transfers a command instructed by the flash translation layer (FTL) to the memory device 110.

The working memory 125 may store firmware, program code, a command and data which are necessary to drive the memory controller 120.

The working memory 125, for example, as a volatile memory, may include at least one among an SRAM (static RAM), a DRAM (dynamic RAM) and an SDRAM (synchronous DRAM).

The ECC circuit 126 may be configured to detect an error bit of data stored in the working memory 125 (that is, read data transferred from the memory device 110) by using an error correction code and correct the detected error bit.

The ECC circuit 126 may be configured to decode data by using an error correction code. The ECC circuit 126 may be realized by any of various code decoders. For example, a decoder which performs unsystematic code decoding or a decoder which performs systematic code decoding may be used.

For example, the ECC circuit 126 may detect an error bit by the unit of sector for each read data. Namely, each read data may be constituted by a plurality of sectors. A sector may mean a data unit smaller than a page as a read unit of a flash memory. Sectors constituting each read data may be matched with one another by the medium of an address.

The ECC circuit 126 may calculate a bit error rate (BER), and may determine whether it is possible to correct an error, by the unit of sector. For example, when a bit error rate (BER) is higher than a reference value, the ECC circuit 126 may determine that a corresponding sector is uncorrectable or has failed. Conversely, when a bit error rate (BER) is lower than the reference value, the ECC circuit 126 may determine that a corresponding sector is correctable or has passed.

The ECC circuit 126 may perform an error detection and correction operation sequentially for all read data. When a sector included in read data is correctable, the ECC circuit 126 may omit an error detection and correction operation for a corresponding sector for next read data. If the error detection and correction operation for all read data is ended in this way, the ECC circuit 126 may detect a sector which is determined to the last to be uncorrectable. There may be one or more sectors that are determined to be uncorrectable. The ECC circuit 126 may transfer an information (for example, an address information) on a sector which is determined to be uncorrectable, to the processor 124.

A bus 127 may be configured to provide channels through which components 121, 122, 124, 125 and 126 of the memory controller 120 communicate. The bus 127 may include, for example, a control bus for transferring various control signals, commands and the likes, a data bus for transferring various data, and the like.

The above-described components 121, 122, 124, 125 and 126 of the memory controller 120 are exemplary only. Not all of these memory device components may be necessary in all embodiments. Some components may be combined. Also, the memory device 120 may contain one or more additional components.

The memory device 110 is described in detail with reference to FIG. 2.

Figure 2:
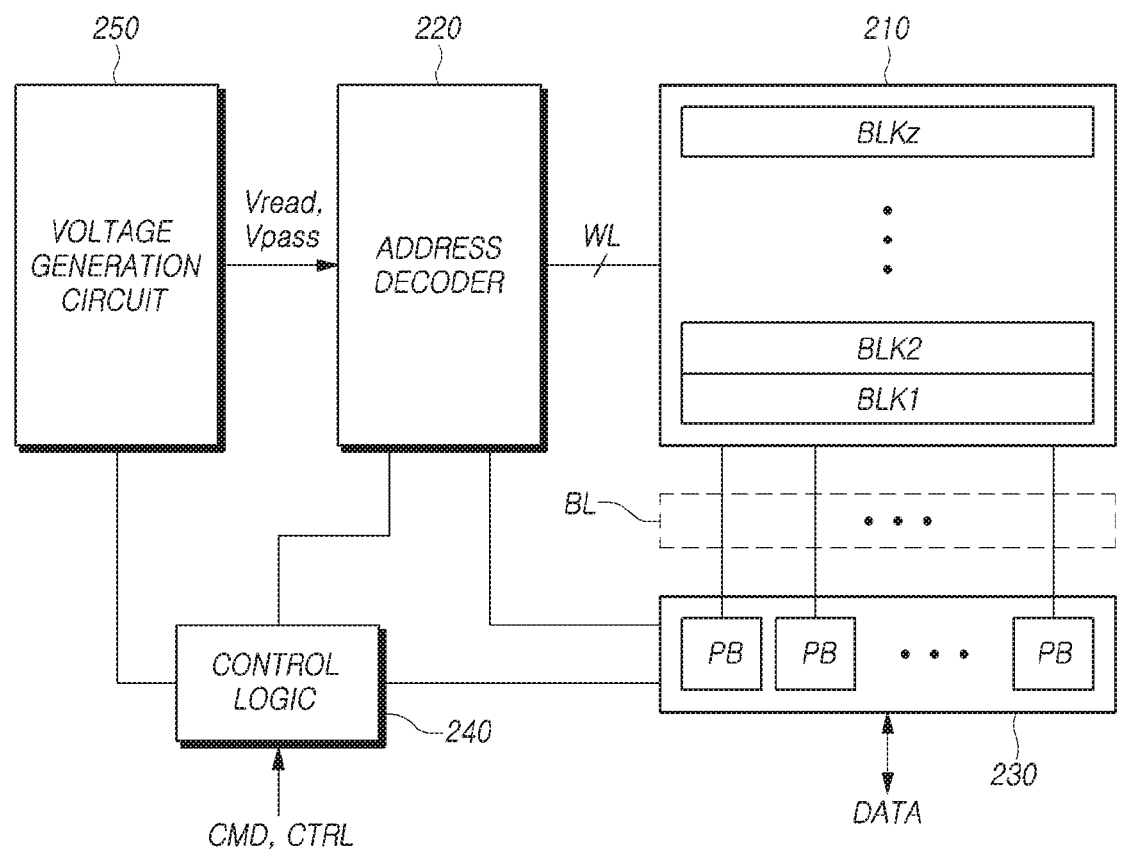
FIG. 2 is a block diagram schematically illustrating an example of a memory device in accordance with an embodiment of the disclosure.

FIG. 2 is a block diagram schematically illustrating an example of the memory device 110 in accordance with an embodiment of the disclosure.

Referring to FIG. 2, the memory device 110 may include a memory cell array 210, an address decoder 220, a read and write circuit 230, control logic 240, and a voltage generation circuit 250.

The memory cell array 210 may include a plurality of memory blocks BLK1 to BLKz (z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells which have vertical channel structure. The memory cell array 210 may be configured by a memory cell array of a two-dimensional structure, or in another embodiment, may be configured by a memory cell array of a three-dimensional structure.

Each of the plurality of memory cells included in the memory cell array may store at least 1-bit data. Each of the plurality of memory cells included in the memory cell array 210 may be a signal level cell (SLC) storing 1-bit data. Each of the plurality of memory cells included in the memory cell array 210 may be a multi-level cell (MLC) which stores 2-bit data. Each of the plurality of memory cells included in the memory cell array 210 may be a triple level cell (TLC) which stores 3-bit data. For another instance, each of the plurality of memory cells included in the memory cell array 210 may be a quad level cell (QLC) which stores 4-bit data. In still another embodiment, the memory cell array 210 may include a plurality of memory cells each of which stores 5 or more-bit data.

Referring to FIG. 2, the address decoder 220, the read and writhe circuit 230, the control logic 240 and the voltage generation circuit 250 may operate as peripheral circuits which drive the memory cell array 210.

The address decoder 220 may be coupled to the memory cell array 210 through the plurality of word lines WL. The address decoder 220 may be configured to operate in response to the control of the control logic 240. The address decoder 220 may receive an address through an input/output buffer in the memory device 110.

The address decoder 220 may be configured to decode a block address in the received address. The address decoder 220 may select at least one memory block depending on the decoded block address. The address decoder 220 may apply a read voltage Vread generated in the voltage generation circuit 250 to a word line selected in a memory block selected in a read voltage applying operation during a read operation, and may apply a pass voltage Vpass to the remaining unselected word lines. Further, the address decoder 220 may apply a verify voltage generated in the voltage generation circuit 250 to a word line selected in a selected memory block in a program verify operation, and may apply the pass voltage Vpass to the remaining unselected word lines.

The address decoder 220 may be configured to decode a column address in the received address. The address decoder 220 may transmit the decoded column address to the read and write circuit 230.

A read operation and a program operation of the memory device 110 may be performed by the unit of page. An address received when a read operation or a program operation is requested may include a block address, a row address and a column address.

The address decoder 220 may selected one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may include a page buffer circuit or a data register circuit. For example, the data register circuit may include a data buffer for performing a data processing function, and in another embodiment, may further include a cache buffer for performing a caching function.

The plurality of page buffers PB may be coupled to the memory cell array 210 through the plurality of bit lines BL. The plurality of page buffers PB may continuously supply sensing current to bit lines coupled with memory cells to sense the threshold voltages (Vth) of the memory cells in a read operation and a program verify operation, and may latch sensed data by sensing, through sensing nodes, that the amounts current flowing depending on the programmed states of the corresponding memory cells have changed. The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. In an embodiment, the read and write circuit 230 may include a column select circuit in addition to the page buffers (or page registers).

The control logic 230 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass in a read operation in response to a voltage generation circuit control signal outputted from the control logic 240.

Figure 3:
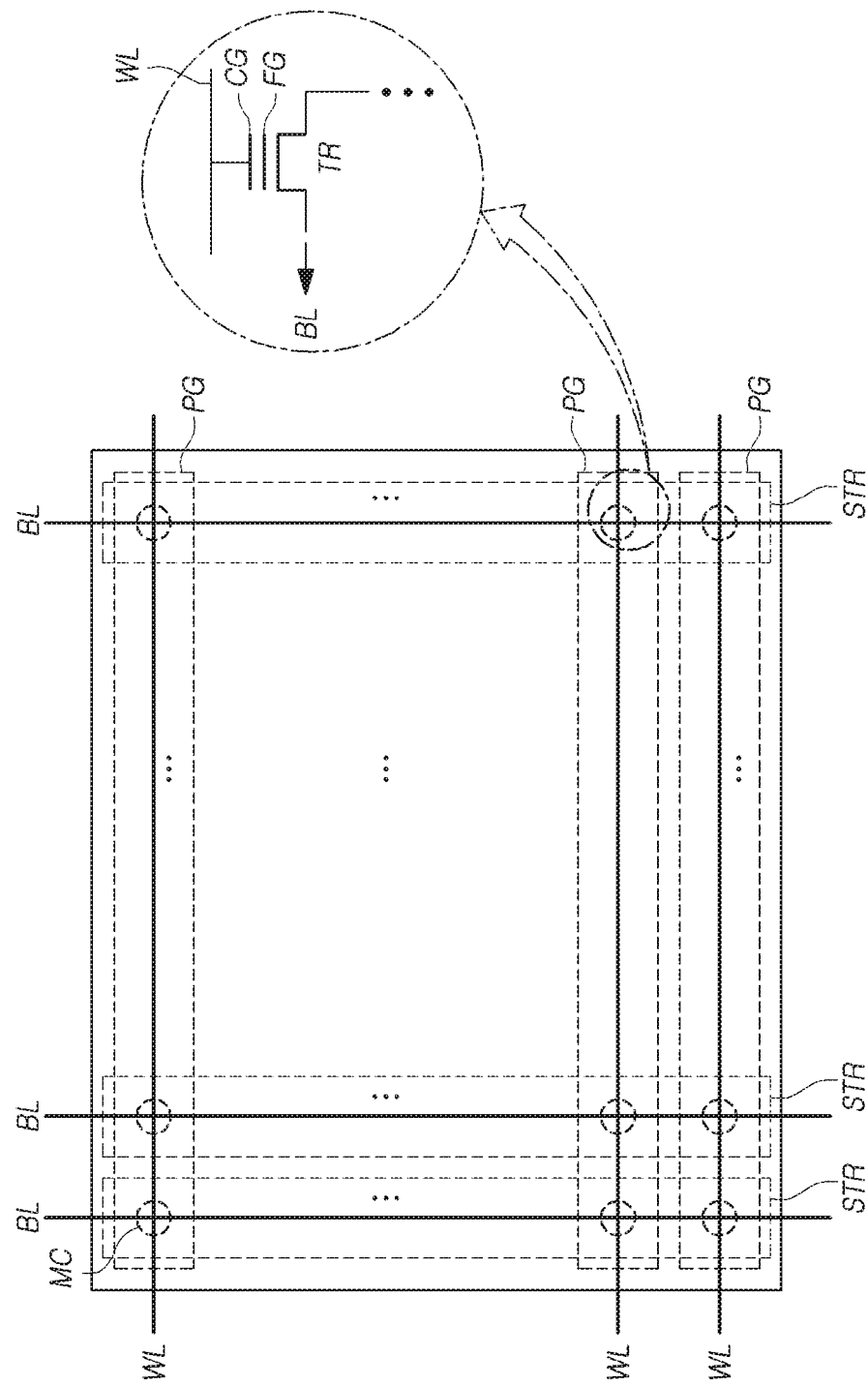
FIG. 3 is a diagram schematically illustrating an example of a memory block of a memory device in accordance with an embodiment of the disclosure.

FIG. 3 is a diagram schematically illustrating an example of one of the plurality of memory blocks BLK1 to BLKz of the memory device 110 in accordance with an embodiment of the disclosure.

Referring to FIG. 3, each of the plurality of memory blocks BLK1 to BLKz included in the memory device 110 may be configured as a plurality of pages PG, and a plurality of strings STR are disposed in the form of a matrix.

The plurality of pages PG correspond to a plurality of word lines WL, and the plurality of strings STR correspond to a plurality of bit lines BL.

That is to say, in each of the plurality of memory blocks BLK1 to BLKz, the plurality of word lines WL and the plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

The intersections of the plurality of word lines WL and the plurality of bit lines BL define a plurality of memory cells MC, one at each intersection. A transistor TR may be disposed in each memory cell MC. For example, the transistor TR disposed in each memory cell MC may include a drain, a source and a gate. The drain (or the source) of the transistor TR may be coupled directly or via one or more other transistors TR with a corresponding bit line, the source (or the drain) of the transistor TR may be coupled directly or via one or more other transistors TR with a source line (which may be the ground), and the gate of the transistor TR may include a floating gate FG which is surrounded by a dielectric and a control gate CG to which a gate voltage is applied.

A read operation and a program operation (write operation) may be performed by the unit of page, and an erase operation may be performed by the unit of memory block.

Referring to FIG. 3, in each of the plurality of memory blocks BLK1 to BLKz, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside the other second outermost word line.

In another embodiment, at least one dummy word line may be additionally disposed between the first outermost word line and the first select line. At least one dummy word line may also be additionally disposed between the second outermost word line and the second select line.

Figure 4:
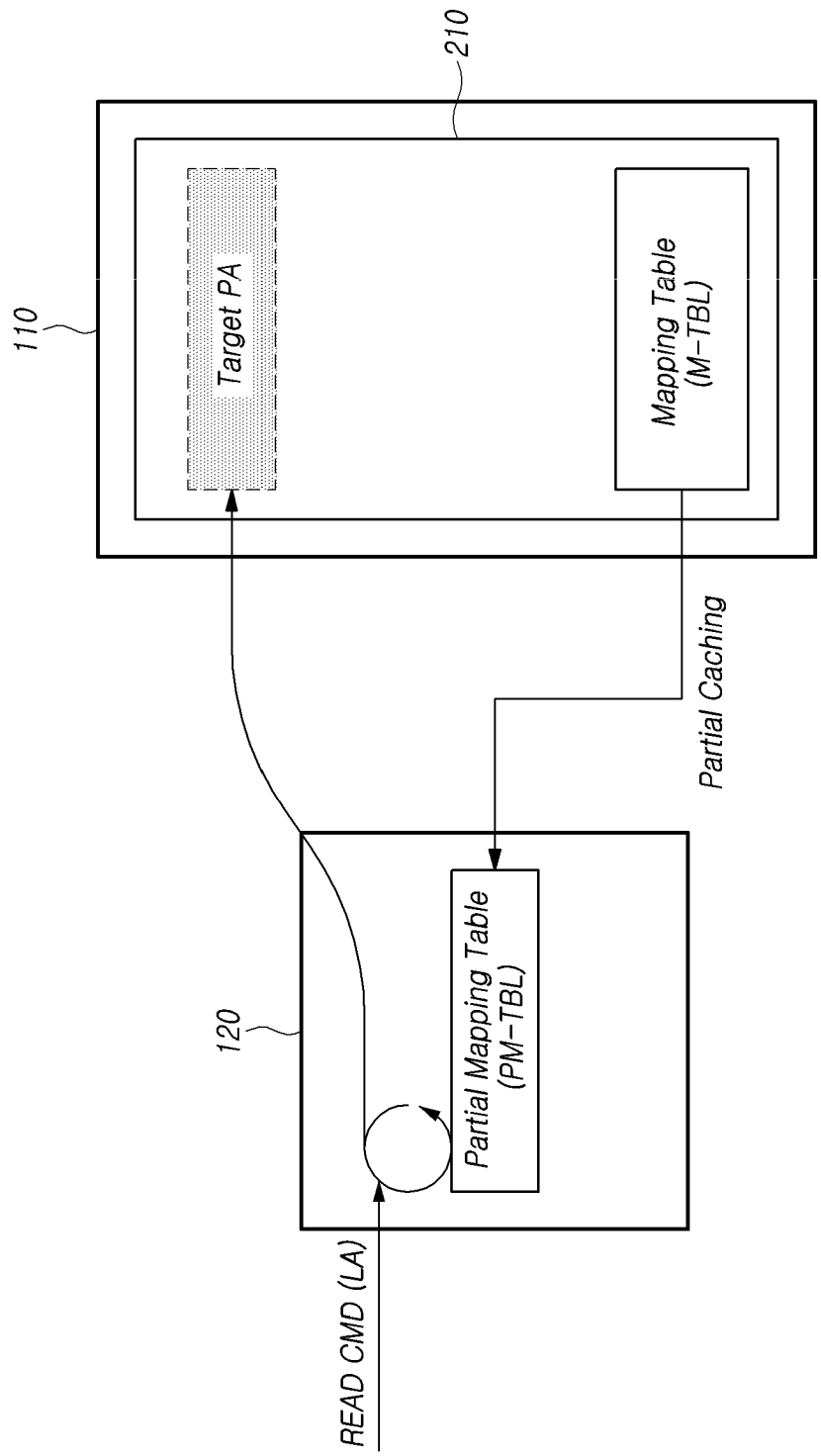
FIG. 4 is a schematic diagram illustrating a method for processing a read command by using a partial caching technique of the memory system in accordance with an embodiment of the disclosure.

FIG. 4 is a schematic diagram illustrating a method for processing a read command READ CMD by using a partial caching technique of the memory system 100 in accordance with an embodiment of the disclosure.

Referring to FIG. 4, the memory device 110 may store a mapping table M-TBL in the memory cell array 210.

The mapping table M-TBL includes plural pieces of mapping information between physical addresses and logical addresses. A physical address PA corresponds to an actual address where data is stored in the memory cell array 210 of the memory device 110. The physical address PA may include, for instance, die information, plane information, memory block information and page information. A logical address LA is an address which is transmitted to the memory system 100 from the host. A piece of mapping information represents a mapping relationship between the physical address PA and the logical address LA.

Referring to FIG. 4, the memory controller 120 may cache a partial mapping table PM-TBL which includes a some of the plural pieces of mapping information included in the mapping table M-TBL.

The partial mapping table PM-TBL may be stored in the working memory 125 corresponding to a cache memory in the memory controller 120. The partial mapping table PM-TBL may include some of the plural pieces of mapping information included in the mapping table M-TBL.

If a read command READ CMD is inputted from the host, the memory controller 120 primarily refers to the partial mapping table PM-TBL to find a physical address PA mapped to a logical address LA identified from the read command READ CMD.

As a result of referring to the partial mapping table PM-TBL, the memory controller 120 controls a read operation for data stored at a position (for example, a page, a memory cell or the like) corresponding to the determined target physical address PA to be performed. The determining of the target physical address PA from the logical address LA as a result of referring to the partial mapping table PM-TBL may be referred to as address conversion.

The technique of caching some of the plural pieces of mapping information of the mapping table M-TBL stored in the memory device 110 into the partial mapping table PM-TBL as described above is referred to as a partial caching technique. Such a partial caching technique may include determining the physical address PA at which data is stored in the memory device 110, by referring to the partial mapping table PM-TBL.

As a result of referring to the partial mapping table PM-TBL through the partial caching technique, when a desired physical address PA is not determined from the partial mapping table PM-TBL (that is, when a cache miss, i.e., desired mapping information does not exist in the partial mapping table PM-TBL, occurs), the memory controller 120 refers to the mapping table M-TBL stored in the memory device 110 or cache mapping information associated with the cache-missed logical address LA from the mapping table M-TBL stored in the memory device 110 in the partial mapping table PM-TBL. In this case, the processing time of the corresponding read command READ CMD may be lengthened.

Figure 5:
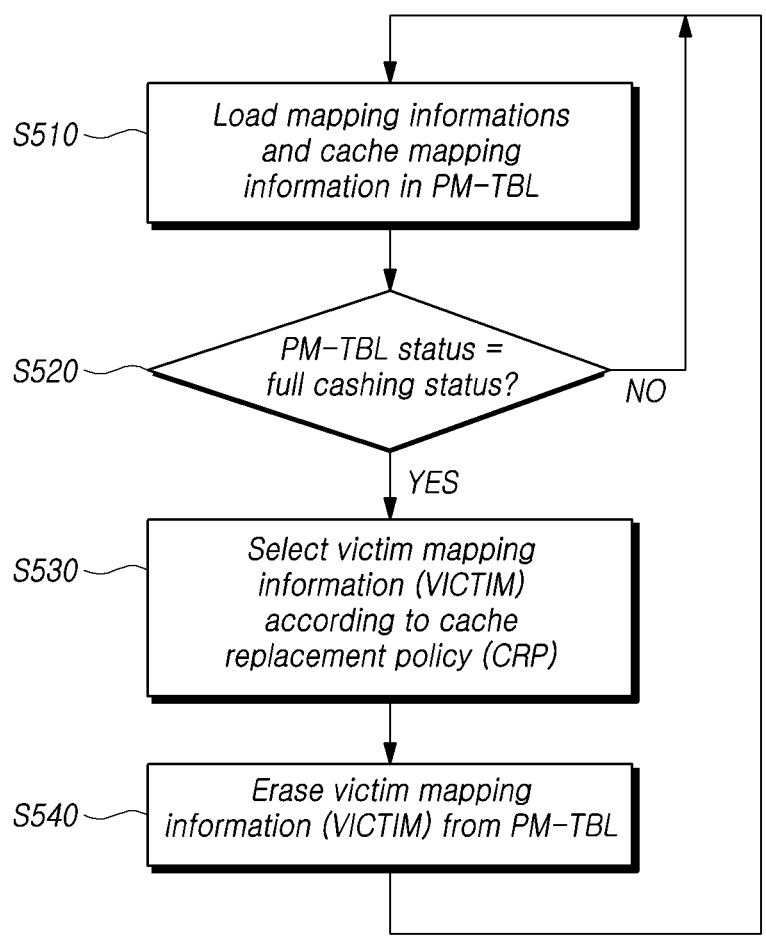
FIG. 5 is a flow chart of a method for managing a partial mapping table in which plural pieces of mapping information are partially loaded for the partial caching technique of the memory system in accordance with an embodiment of the disclosure.

FIG. 5 is a flow chart of a method for managing the partial mapping table PM-TBL in which plural pieces of mapping information are partially loaded and cached for the partial caching technique of the memory system 100 in accordance with an embodiment of the disclosure.

Referring to FIG. 5, the method for managing the partial mapping table PM-TBL may include partial caching step S510, caching status checking step S520 and cache replacement steps S530 and S540.

At the partial caching step S510, the memory controller 120 caches some of the plural pieces of mapping information from the mapping table M-TBL stored in the memory device 110 in the partial mapping table PM-TBL.

At the caching status checking step S520, the memory controller 120 checks whether a caching status of the partial apping table PM-TBL is a full caching status.

Full caching status here means a state in which the partial mapping table PM-TBL is full of mapping information and thus cannot store any more mapping information. In this case, the memory controller 120 cannot load any new mapping information from the mapping table M-TBL stored in the memory device 110 and cache it in the partial mapping table PM-TBL.

When it is determined at the caching status checking step S520 that the caching status of the partial mapping table PM-TBL is not the full caching status, the memory controller 120 may perform the partial caching step S510 again.

When it is determined at the caching status checking step S520 that the caching status of the partial mapping table PM-TBL is the full caching status, the memory controller 120 may perform the cache replacement steps S530 and S540.

At the cache replacement steps S530 and S540, the memory controller 120 selects at least one piece of mapping information among the plural pieces of mapping information included in the partial mapping table PM-TBL which is in the full caching status, as victim mapping information VICTIM (S530), and erases the selected victim mapping information VICTIM from the partial mapping table PM-TBL and thereby secures a space in which new or additional mapping information is to be cached (S540). Thereafter, the memory controller 120 may perform the partial caching step S510.

At the step S530 of selecting the victim mapping information VICTIM, the memory controller 120 may select at least one piece of mapping information among the plural pieces of mapping information included in the partial mapping table PM-TBL, as the victim mapping information VICTIM, according to a cache replacement policy (CRP).

The cache replacement policy (CRP) is a policy that applies when the partial mapping table PM-TBL is in the full caching status. The CRP enables caching new or additional mapping information in the partial mapping table PM-TBL when it is the full caching status, that is, changing the caching status of the partial mapping table PM-TBL from the full caching status to a non-full caching status.

According to such a cache replacement policy (CRP), at least one piece of mapping information among the plural pieces of mapping information included in the partial mapping table PM-TBL is selected as the victim mapping information VICTIM and is erased, so that new or additional mapping information may be cached to the space secured by erasing the victim mapping information VICTIM.

In the cache replacement policy (CRP), which pieces of mapping information among the plural pieces of mapping information included in the partial mapping table PM-TBL to be selected as the victim mapping information VICTIM may exert a substantial influence on cache efficiency/performance and the processing speed of the read command READ CMD.

Basically, the cache replacement policy (CRP) aims to select mapping information which is least likely to be used (referred to) in the future, as the victim mapping information VICTIM.

In order to the execute cache replacement policy (CRP), the memory controller 120 may manage a cache replacement policy parameter CRPF by matching it to each of the plural pieces of mapping information in the partial mapping table PM-TBL, and may select, as the victim mapping information VICTIM, mapping information least likely to be used among the plural pieces of mapping information included in the partial mapping table PM-TBL based on the cache replacement policy parameter CRPF.

For example, the cache replacement policy parameter CRPF may include at least one of reference count information CNT and reference history information ORD.

The reference count information CNT indicates a count, e.g., the number of times that a corresponding piece of mapping information is referred to (e.g., a count of the number of cache-hits of a corresponding piece of mapping information). The reference history information ORD may indicate when a corresponding piece of mapping information is referred to (e.g., a history of when cache-hits of the corresponding piece of mapping information occur) or a relative priority with which the corresponding piece of mapping information is referred to (e.g., rank of how recently the cache-hits of the corresponding piece of mapping information occurred).

When the reference count information CNT is used as the cache replacement policy parameter CRPF, the memory controller 120 may select mapping information of which a value of the reference count information CNT is lowest, as the victim mapping information VICTIM, through the execution of the cache replacement policy (CRP).

When the reference history information ORD is used as the cache replacement policy parameter CRPF, the memory controller 120 may select mapping information which has not been referred to for the longest time, as the victim mapping information VICTIM, through the execution of the cache replacement policy (CRP).

FIGS. 6 to 9 are diagrams illustrating a method for managing the partial mapping table PM-TBL of the memory system 100 in accordance with an embodiment of the disclosure. The diagrams of FIGS. 6 to 9 are presented according to the management method of the partial mapping table PM-TBL illustrated in FIG. 5.

Referring to FIG. 6, the mapping table M-TBL stored in the memory device 110 includes plural pieces of mapping information, e.g, MI1 to MI8. Each of the plural pieces of mapping information MI1, MI2, . . . , MI8 may include a logical address LA and a physical address which match each other or matching information between the logical address LA and the physical address PA.

The size of physical area covered by each piece of mapping information (e.g. 4 KB/8 KB) may be different. If the size of the physical area covered by each piece of mapping information is different from each other, each piece of mapping information may further include information indicating the physical area (e.g. starting address/length).

According to an example illustrated in FIG. 6, first to fourth pieces of mapping information MI1, MI2, MI3 and MI4 are cached from the mapping table M-TBL in the partial mapping table PM-TBL. At this time, for instance, the partial mapping table PM-TBL is in a non-full caching status.

Each of MI1, MI2, MI3 and MI4 cached in the partial mapping table PM-TBL may include a logical address LA and a physical address PA which match each other.

Each of MI1, MI2, MI3 and MI4 cached in the partial mapping table PM-TBL may be managed in accordance with a cache replacement policy parameter CRPF. The cache replacement policy parameter CRPF may include at least one of the reference count information CNT and the reference history information ORD. For example, the first piece of mapping information MI1 may include a first logical address LA1 and a first physical address PA1 which match each other, and may be managed in accordance with at least one of first reference count information CNT1 and first reference history information ORD1. The second piece of mapping information MI2 may include a second logical address LA2 and a second physical address PA2 which match each other, and may be managed by being matched with at least one of second reference count information CNT2 and second reference history information ORD2. The third piece of mapping information MI3 may include a third logical address LA3 and a third physical address PA3 which match each other, and may be managed by being matched with at least one of third reference count information CNT3 and third reference history information ORD3. The fourth piece of mapping information MI4 may include a fourth logical address LA4 and a fourth physical address PA4 which match each other, and may be managed by being matched with at least one of fourth reference count information CNT4 and fourth reference history information ORD4.

Referring to FIG. 7, due to the occurrence of a cache miss for a new read command READ CMD or the like, fifth mapping information MI5 may be additionally cached from the mapping table M-TBL in the partial mapping table PM-TBL. It is assumed that, as a result of such caching of MI5, the partial mapping table PM-TBL becomes a full-caching status.

The fifth mapping information MI5 cached in the partial mapping table PM-TBL may include a fifth logical address LA5 and a fifth physical address PA5 which match each other, and may be managed in accordance with at least one of fifth reference count information CNT5 and fifth reference history information ORD5.

Referring to FIG. 8, when assuming that, due to the occurrence of a cache miss, a situation arises in which another piece of mapping information (for example, a seventh piece of mapping information MI7) needs to be cached in the partial mapping table PM-TBL. However, since the partial mapping table PM-TBL is in the full caching status, in order to secure a space for caching the new mapping information (for example, MI7), at least one piece of mapping information (for example, MI1) among the pieces of mapping information MI1, MI2, MI3, MI4 and MI5 included in the partial mapping table PM-TBL should be selected and erased.

When assuming that the first reference count information CNT1 corresponding to the first piece of mapping information MU is lowest or the first reference history information ORD1 has a lowest priority (that is, is not referred to for the longest time), according to execution of the cache replacement policy CRP, the first piece of mapping information MI1 may be selected as the victim mapping information VICTIM.

The first piece of mapping information MI1 selected as the victim mapping information VICTIM may be erased to secure a space for a new or another piece mapping information, and, referring to FIG. 9, the seventh piece of mapping information MI7 may be cached from the mapping table M-TBL in the partial mapping table PM-TBL.

As a piece of mapping information MI, which is least likely to be referred to in the future, according to the cache replacement policy (CRP), is selected as the victim mapping information VICTIM and is evicted from the partial mapping table PM-TBL, the possibility of a cache hit in which desired mapping information MI exists in the partial mapping table PM-TBL may be increased.

Despite that, the piece of mapping information MI which is selected as the victim mapping information VICTIM according to the cache replacement policy (CRP) and is evicted may actually not be least likely to be referred to in the future. In this way, because there may be inaccuracy in the selection of the victim mapping information VICTIM, the success rate of a cache hit may deteriorate.

Moreover, the reference count information CNT and the reference history information ORD used as the cache replacement policy parameter CRPF for the selection of the victim mapping information VICTIM may not accurately predict future reference possibility.

Therefore, embodiments of the disclosure provide a scheme capable of further increasing the possibility of mapping information MI actually being least likely to be referred to in the future, to be selected as the victim mapping information VICTIM, and thereby further improving the success rate of a cache hit. This is described below in detail.

Figure 10:
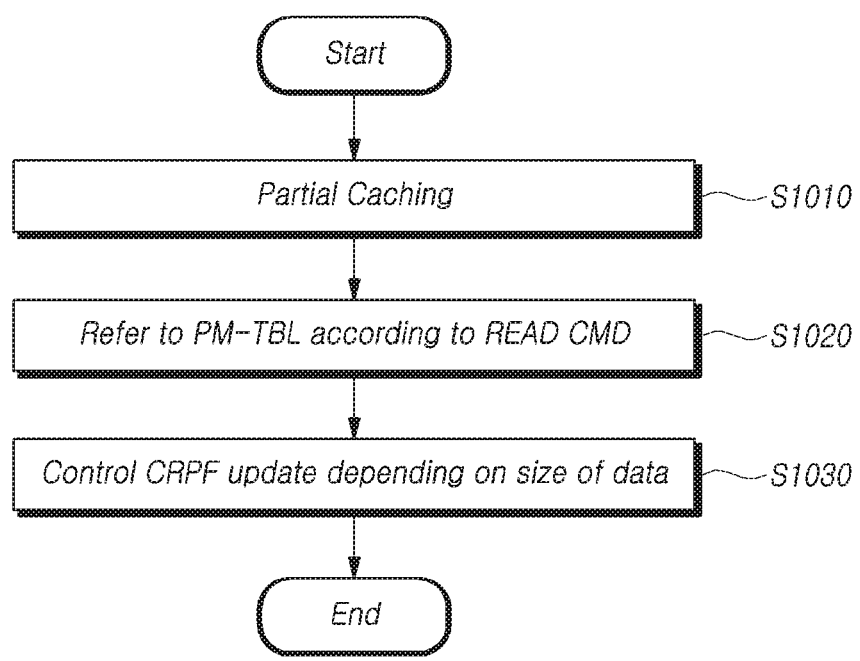
FIG. 10 is a flow chart of an operation method for efficient caching of the memory controller in accordance with an embodiment of the disclosure.

FIG. 10 is a flow chart of an operation method for efficient caching of the memory controller 120 in accordance with an embodiment of the disclosure.

The operation method of the memory controller 120 may include step S1010 in which the memory controller 120 caches the partial mapping table PM-TBL including some of the plural pieces of mapping information MI between physical addresses and logical addresses included in the mapping table M-TBL stored in the memory device 110, step S1020 in which the memory controller 120 refers to data indicated by a read command READ CMD and a corresponding piece of mapping information MI in the partial mapping table PM-TBL, and step S1030 in which the memory controller 120 controls an update for the cache replacement policy parameter CRPF of the mapping information MI to be performed or omitted depending on the size of the data.

The cache replacement policy parameter CRPF is also referred to as a reference-related parameter CRPF. The cache replacement policy parameter CRPF of a piece of mapping information MI may include at least one of, for example, reference history information ORD and reference count information CNT for that piece of mapping information.

According to the above description, whether to update the cache replacement policy parameter CRPF of the mapping information MI may be determined depending on the size of the corresponding data.

When observing the workload of the host, a percentage of read commands READ CMD varies depending on a data size. In other words, a percentage by which a piece of mapping information MI is referred to may vary depending on the size of corresponding data.

Therefore, by differently controlling whether to update the cache replacement policy parameter CRPF of mapping information MI depending on the size of corresponding data, mapping information MI to be cached in the partial mapping table PM-TBL may be managed in consideration of the size of data. Through such management, the success rate of a cache hit may be improved.

At the step S1030, in the case where the size of data is larger than a threshold value, the memory controller 120 may omit an update for the cache replacement policy parameter CRPF of a corresponding piece of mapping information MI. In the case where the size of data is smaller than the threshold value, the memory controller 120 may perform the update for the cache replacement policy parameter CRPF of a corresponding piece of mapping information MI.

The threshold value described above, represents a size of data and serves as a reference for determining whether to update the cache replacement policy parameter CRPF. Such threshold value may be determined, for example, according to reference frequencies of plural pieces of mapping information MI depending on sizes of data, and as the case may be, may be determined according to percentages of read commands READ CMD for sizes of data on the workload of the host.

According to the above description, the cache replacement policy parameter CRPF of a mapping information MI is updated when the size of corresponding data is small, and is not updated when the size of the corresponding data is large.

Accordingly, it is possible to cause mapping information MI corresponding to data of a larger size rather than mapping information MI corresponding to data of a smaller size to be highly likely selected as the victim mapping information VICTIM in the partial mapping table PM-TBL, and the partial mapping table PM-TBL may be managed in such a state in which plural pieces of mapping information MI corresponding to data of small sizes are cached therein.

When observing the workload of the host, read commands READ CMD corresponding to data of small sizes occupy a high percentage of such workload. Namely, as mapping information MI corresponds to data of a smaller size, the mapping information MI may be frequently referred to, and, as mapping information MI corresponds to data of a larger size, the mapping information MI may be infrequently referred to and thus is of low interest.

Thus, by controlling the update of the cache replacement policy parameter CRPF of mapping information MI to be performed when the size of corresponding data is small and to be omitted when the size of the corresponding data is large, mapping information MI corresponding to data of small sizes may be mainly cached in the partial mapping table PM-TBL. As a result of referring to the partial mapping table PM-TBL, the success rate of a cache hit may be further improved.

Figure 11:
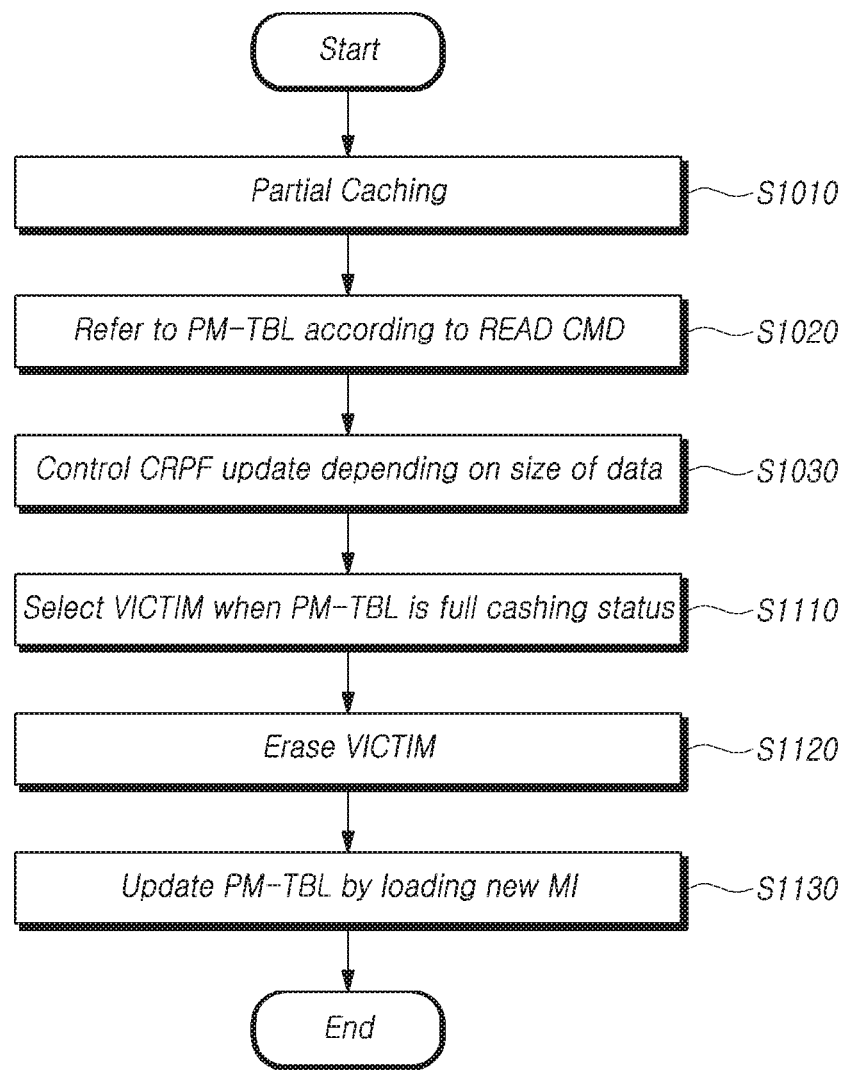
FIG. 11 is a flow chart of another operation method for efficient caching of the memory controller in accordance with an embodiment of the disclosure.

FIG. 11 is a flow chart of another operation method for efficient caching of the memory controller 120 in accordance with an embodiment of the disclosure.

Referring to FIG. 11, after step S1030 of FIG. 10, the operation method of the memory controller 120 may further include, step S1110 in which the memory controller 120 selects, when the partial mapping table PM-TBL is in the full-caching status, a victim mapping information VICTIM among the plural pieces of mapping information MI included in the partial mapping table PM-TBL, based on a cache replacement policy parameter CRPF as a reference-related parameter of each piece of mapping information MI included in the partial mapping table PM-TBL, step S1120 in which the memory controller 120 erases the victim mapping information VICTIM from the partial mapping table PM-TBL, and step S1130 in which a new or another piece of mapping information MI is cached from the mapping table M-TBL in the partial mapping table PM-TBL.

As described above, by controlling the update of the cache replacement policy parameter CRPF of mapping information MI to be performed when the size of corresponding data is small and to be omitted when the size of the corresponding data is large, at the step S1110, the possibility of the mapping information MI corresponding to data of a larger size to be selected as a victim mapping information VICTIM may be increased.

Due to this fact, the partial mapping table PM-TBL may achieve a higher success rate of a cache hit.

Figure 12:
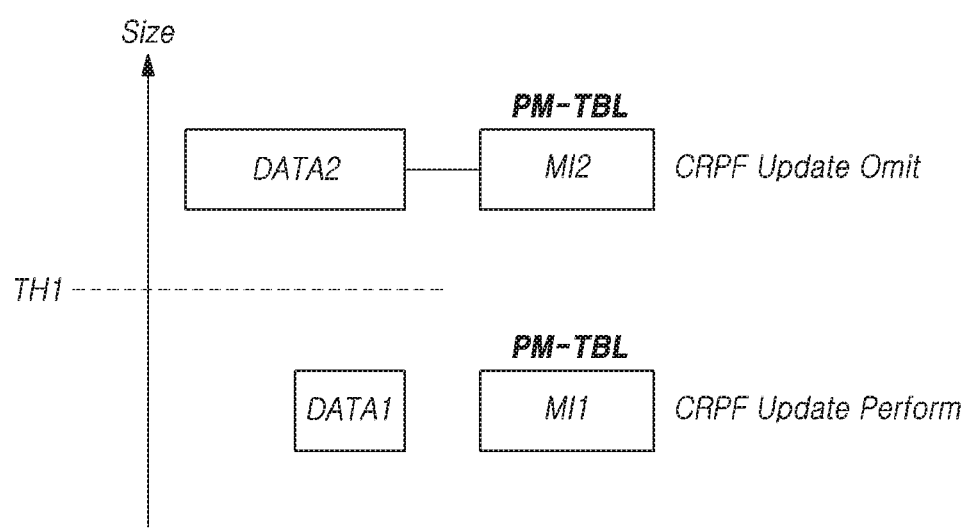
FIG. 12 is a diagram illustrating a method for controlling cache replacement policy parameter update for efficient caching of the memory controller in accordance with an embodiment of the disclosure.

FIG. 12 is a diagram of a method for controlling cache replacement policy parameter update for efficient caching of the memory controller 120 in accordance with an embodiment of the disclosure.

Referring to FIG. 12, the memory controller 120 may refer to a first piece of mapping information MI1 corresponding to first data DATA1 indicated by a first read command READ CMD, in the partial mapping table PM- TBL, and may perform an update for a cache replacement policy parameter CRPF as the reference-related parameter of MI1.

The memory controller 120 may refer to a second piece of mapping information MI2 corresponding to second data DATA2 indicated by a second read command READ CMD and having a second size different from a first size of the first data DATA1, in the partial mapping table PM-TBL, and may omit an update for a cache replacement policy parameter CRPF as the reference-related parameter of the second piece of mapping information MI2.

The cache replacement policy parameter CRPF as a reference-related parameter may include at least one of, for example, reference history information ORD and reference count information CNT.

The above-described memory controller 120 may include the host interface 121 for communicating with the host, the memory interface 122 for communicating with the memory device 110 which stores the mapping table M-TBL including plural pieces of mapping information between physical addresses PA and logical addresses LA, the working memory 125 as a cache memory which caches the partial mapping table PM-TBL including a part among the plural pieces of mapping information MI included in the mapping table M-TBL, and the control circuit 123 for controlling the memory device 110.

The control circuit 123 may refer to a first piece of mapping information MI1 corresponding to first data DATA1 indicated by a first read command READ CMD, in the partial mapping table PM-TBL, and may perform an update for a cache replacement policy parameter CRPF as the reference-related parameter of MI1.

The control circuit 123 may refer to a second piece of mapping information MI2 corresponding to second data DATA2 indicated by a second read command READ CMD and having a second size different from a first size of the first data DATA1, in the partial mapping table PM-TBL, and may omit an update for a cache replacement policy parameter CRPF as the reference-related parameter of MI2.

Referring to FIG. 12, the first size of the first data DATA1 corresponding to the first piece of mapping information MI1 may be smaller than the second size of the second data DATA2 corresponding to the second piece of mapping information MI2.

The first size of the first data DATA1 corresponding to the first piece of mapping information MI1 may be smaller than a first threshold value TH1, and the second size of the second data DATA2 corresponding to the second piece of mapping information MI2 may be larger than the first threshold value TH1. One of the first size of the first data DATA1 corresponding to MI1 and the second size of the second data DATA2 corresponding to MI2 may be equal to the first threshold value TH1. As an example, the first size of the first data DATA1 corresponding to MI1 may be equal to or smaller than the first threshold value TH1, and the second size of the second data DATA2 corresponding to MI2 may exceed the first threshold value TH1. As another example, the first size of the first data DATA1 corresponding to MI1 may be smaller than the first threshold value TH1, and the second size of the second data DATA2 corresponding to MI2 may be equal to or larger than the first threshold value TH1.

The control circuit 123 of the memory controller 120 may select, when the partial mapping table PM-TBL is in a full-caching status, a victim mapping information VICTIM among the plural pieces of mapping information MI included in the partial mapping table PM-TBL, based on reference history information ORD or reference count information CNT of each of the plural pieces of mapping information MI included in the partial mapping table PM-TBL; may erase the victim mapping information VICTIM from the partial mapping table PM-TBL, may cache a new or another piece of mapping information MI from the mapping table M-TBL in the partial mapping table PM-TBL.

As an update for a cache replacement policy parameter CRPF as a reference-related parameter is omitted for the second piece of mapping information MI2 corresponding to the second data DATA2 of the second size larger than the first threshold value TH1, MI2 may have a high possibility to be selected as a victim mapping information VICTIM, as compared to the first piece of mapping information MI1 corresponding to the first data DATA1 of the first size smaller than the first threshold value TH1.

The cache replacement policy parameter update control method according to the example illustrated in FIG. 12 is a scheme of controlling the update of cache replacement policy parameter CRPF as a reference-related parameter to be performed or not to be performed.

Hereinafter, a more precise cache replacement policy parameter update control method will be described.

Figure 13:
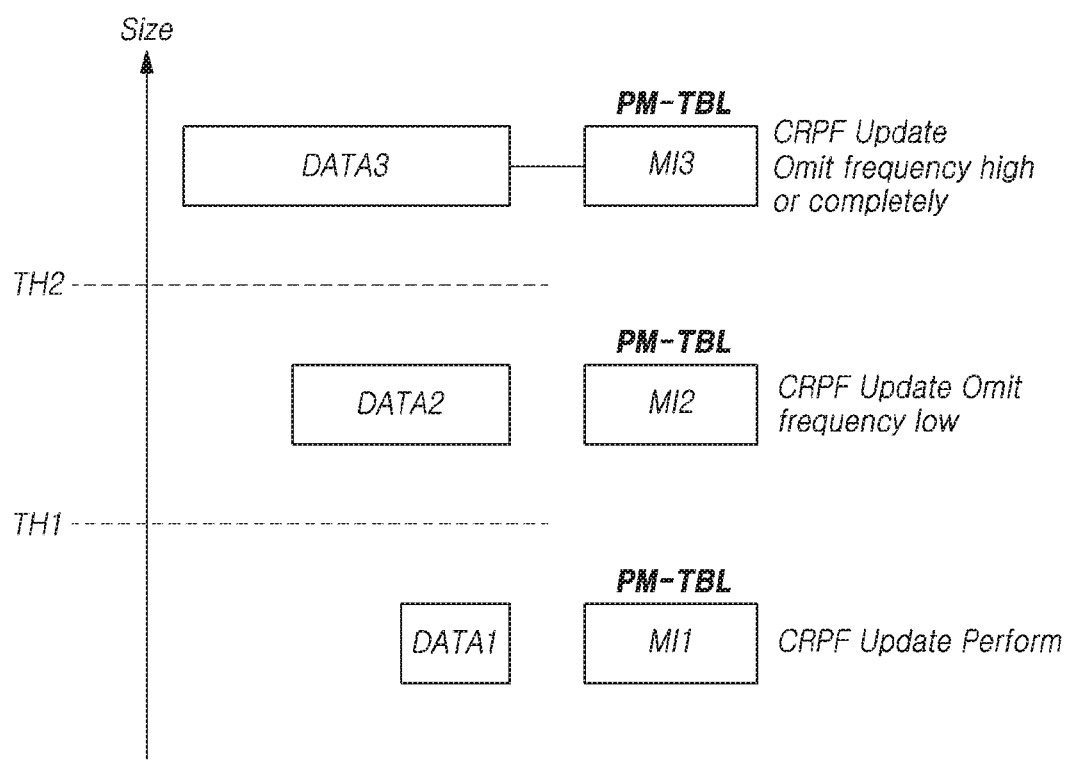
FIG. 13 is a diagram to illustrating another method for controlling cache replacement policy parameter update for efficient caching of the memory controller in accordance with an embodiment of the disclosure.

FIG. 13 is a diagram of another method for controlling cache replacement policy parameter update for efficient caching of the memory controller 120 in accordance with an embodiment of the disclosure.

Referring to FIG. 13, the control circuit 123 of the memory controller 120 may refer to a first piece of mapping information MI1 corresponding to first data DATA1 indicated by a first read command READ CMD, in the partial mapping table PM-TBL, and may perform an update for a cache replacement policy parameter CRPF as the reference-related parameter of MI1.

The control circuit 123 may refer to a second piece of mapping information MI2 corresponding to second data DATA2 indicated by a second read command READ CMD and having a second size different from a first size of the first data DATA1, in the partial mapping table PM-TBL, and may omit an update for a cache replacement policy parameter CRPF as the reference-related parameter of MI2.

Further, the control circuit 123 may refer to a third piece of mapping information MI3 corresponding to third data DATA3 indicated by a third read command READ CMD and having a third size larger than the second size, in the partial mapping table PM-TBL, and may omit an update for a cache replacement policy parameter CRPF as the reference-related parameter of MI3.

As described above, the update of the cache replacement policy parameter CRPF of the third piece of mapping information MI3 corresponding to the third data DATA3 having the third size and the update of the cache replacement policy parameter CRPF of the second piece of mapping information MI2 corresponding to the second data DATA2 having the second size may be omitted. In this regard, the update may be omitted every time reference is performed, or may be omitted once among several times.

An update omission frequency of the cache replacement policy parameter CRPF of the third piece of mapping information MI3 corresponding to the third data DATA3 having the third size and an update omission frequency of the cache replacement policy parameter CRPF of the second piece of mapping information MI2 corresponding to the second data DATA2 having the second size may be different from each other.

For example, it is assumed that the first size is smaller than a first threshold value TH1, the second size is equal to or larger than the first threshold value TH1 and is smaller than a second threshold value TH2, and the third size is equal to or larger than the second threshold value TH2.

As an example of a method for controlling an update omission frequency of the cache replacement policy parameter CRPF, the update of the cache replacement policy parameter CRPF of the third piece of mapping information MI3 corresponding to the third data DATA3 having the third size equal to or larger than the second threshold value TH2 may be completely omitted.

That is to say, even though the third piece of mapping information MI3 corresponding to the third data DATA3 having the third size is referred to, the cache replacement policy parameter CRPF of MI3 may not be updated.

The update of the cache replacement policy parameter CRPF of the second piece of mapping information MI2 corresponding to the second data DATA2 having the second size equal to or larger than the first threshold value TH1 and smaller than the second threshold value TH2 may not be performed each time MI2 is referenced. Instead, the update of the cache replacement policy parameter CRPF of MI2 may be performed only some of the time MI2 is referenced.

In other words, even though the second piece of mapping information MI2 corresponding to the second data DATA2 having the second size is referred to, the update of the cache replacement policy parameter CRPF of MI2 may be omitted certain times when MI2 is referenced.

As another example of the method for controlling an update omission frequency of the cache replacement policy parameter CRPF, an update omission frequency for the cache replacement policy parameter CRPF as the reference-related parameter of the third piece of mapping information MI3 corresponding to the third data DATA3 having the third size may be controlled to be higher than an update omission frequency for the cache replacement policy parameter CRPF as the reference-related parameter of the second piece of mapping information MI2 corresponding to the second data DATA2 having the second size.

According to the cache replacement policy parameter update control method described above with reference to FIG. 13, by controlling whether to perform the update of the cache replacement policy parameter CRPF as a reference-related parameter and by controlling performance frequency (corresponding to an update omission frequency) depending on the size of data, the memory controller 120 may manage the partial mapping table PM-TBL more precisely, and through this, the success rate of a cache hit may be further increased.

Figure 14:
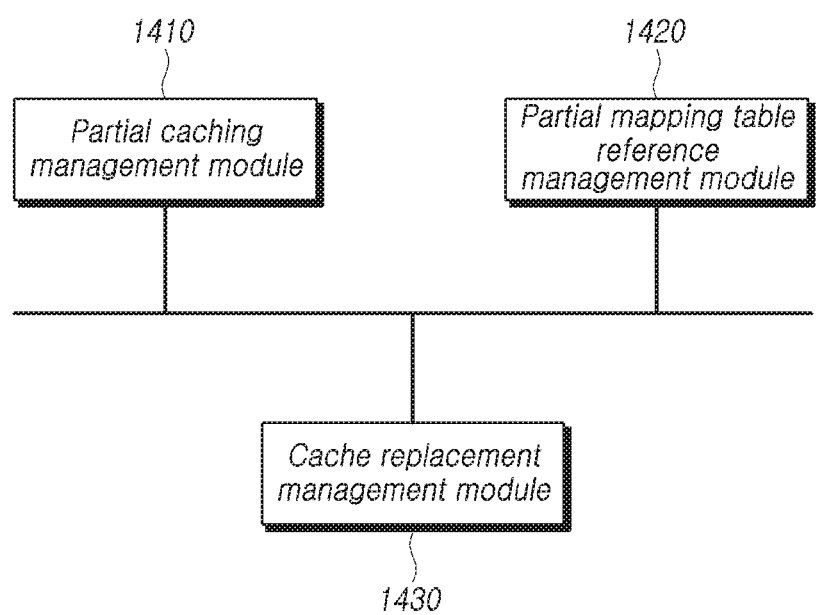
FIG. 14 is a schematic functional block diagram illustrating a memory controller in accordance with an embodiment of the disclosure.

FIG. 14 is a schematic functional block diagram illustrating an example of the memory controller 120 in accordance with an embodiment of the disclosure.

Referring to FIG. 14, the memory controller 120 may include functional blocks such as a partial caching management module 1410, a partial mapping table reference management module 1420 and a cache replacement management module 1430.

The partial caching management module 1410 may partially cache some of the plural pieces of mapping information included in the mapping table M-TBL stored in the memory device 110 and thereby cache the partial mapping table PM-TBL in a cache memory, and may perform management such as updating the partial mapping table PM-TBL through caching of a new or another piece of mapping information.

The partial mapping table reference management module 1420 may perform a management function to allow reference to the partial mapping table PM-TBL to be made when a command such as a read command is received.

The cache replacement management module 1430 may check a caching status of the partial mapping table PM-TBL, and may execute the cache replacement policy (CRP) such as selecting a victim mapping information VICTIM among the plural pieces of mapping information included in the partial mapping table PM-TBL.

The above-described functional blocks may be software modules, and may cooperate to perform the above-described operation method of the memory controller 120.

Figure 15:
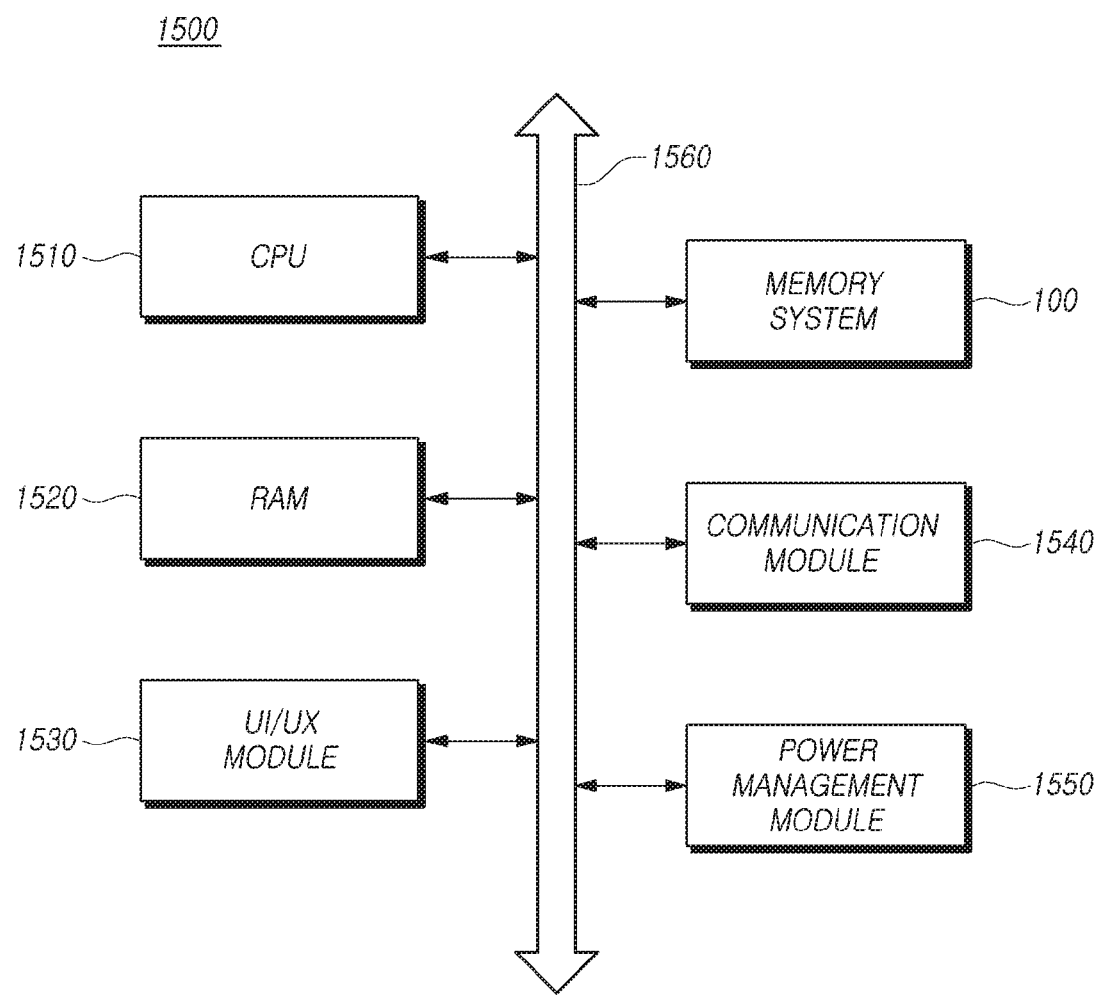
FIG. 15 is a block diagram schematically illustrating a computing system in accordance with an embodiment of the disclosure.

FIG. 15 is a block diagram schematically illustrating an example of a computing system 1500 in accordance with an embodiment of the disclosure.

Referring to FIG. 15, a computing system 1500 may include a memory system 100, a centralprocessing unit (CPU) 1510, a RAM 1520, a UI/UX (user interface/user experience) module 1530, a communication module 1540 that operates under at least one communication scheme and a power management module 1550, all of which are electrically coupled to a system bus 1560.

The computing system 1500 may include a PC (personal computer), a mobile device, e.g., a smartphone or a tablet or any of various electronic devices.

The computing system 1500 may further include a battery for supplying an operating voltage, and may further include an application chipset, a graphic-related module, a camera image processor (CIS), a DRAM and other components as those skilled in the art would understand.

The memory system 100 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and/or an FRAM (ferroelectric RAM). In addition, the memory system 100 may be realized as, or mounted in, any of various types of storage devices.

As is apparent from the above description, embodiments of the disclosure may provide a memory system, a memory controller and an operating method thereof, capable of enabling quick processing of a host request, such as a read command or a write command.

Also, embodiments of the disclosure may provide a memory system, a memory controller and an operating method thereof, capable of improving cache efficiency for mapping information for processing of a host request.

Further, embodiments of the disclosure may provide a memory system, a memory controller and an operating method thereof, capable of achieving a high success rate of a cache hit by efficiently caching mapping information between physical addresses and logical addresses.

Although various embodiments of the disclosure have been illustrated and described, those skilled in the art will appreciate in light of the present invention that various modifications, additions and substitutions are possible, without departing from the scope and spirit of the disclosure. Therefore, the embodiments disclosed herein should be considered in a descriptive sense only and not as limiting the scope of the present invention. The present invention is defined by the appended claims and encompasses all equivalents falling within the scope of the appended claims.

What is claimed is:

1. A memory system comprising:
a memory device configured to store a mapping table having plural pieces of mapping information mapping between physical addresses and logical addresses; and
a memory controller configured to cache a partial mapping table including some of the plural pieces of mapping information included in the mapping table,
wherein the memory controller refers to a first piece of mapping information corresponding to first data indicated by a first command, in the partial mapping table, and performs an update for a reference-related parameter of the first piece of mapping information, and
wherein the memory controller refers to a second piece of mapping information corresponding to second data indicated by a second command, in the partial mapping table, and size of the second data is a second size, which is different from a first size of the first data and does not perform an update for a reference-related parameter of the second piece of mapping information,
wherein the first size is smaller than the second size,
wherein the first size is equal to or smaller than a threshold value and the second size exceeds the threshold value,
wherein the memory controller refers to a third piece of mapping information corresponding to third data indicated by a third command and size of the third data is a third size, which is larger than the second size, in the partial mapping table, and does not perform an update for a reference-related parameter of the third piece of mapping information,
wherein the first size is smaller than a first threshold value, the second size is equal to or larger than the first threshold value and is smaller than a second threshold value, and the third size is equal to or larger than the second threshold value,
wherein the update of the reference-related parameter of the third piece of mapping information and the update of the reference-related parameter of the second piece of mapping information are not performed at different frequency, and
wherein a frequency that the reference-related parameter of the third piece of mapping information, corresponding to the third data having the third size, is not updated is higher than a frequency that the reference-related parameter of the second piece of mapping information, corresponding to the second data having the second size, is not updated.

2. The memory system according to claim 1, wherein the reference-related parameter includes at least one of reference history information and reference count information.

3. The memory system according to claim 1, wherein, when the partial mapping table is in a full caching status, the memory controller selects victim mapping information among plural pieces of mapping information included in the partial mapping table, based on reference-related parameters thereof, erases the victim mapping information from the partial mapping table, and caches another piece of mapping information from the mapping table in the partial mapping table.

4. The memory system according to claim 3, wherein the second piece of mapping information is more likely to be selected as the victim mapping information than the first mapping piece information, because the update for the reference-related parameter of the second mapping information is not performed.

5. A memory controller comprising:
a host interface for communicating with a host;
a memory interface configured to communicate with a memory device which stores a mapping table having plural pieces of mapping information mapping between physical addresses and logical addresses;
a cache memory configured to cache a partial mapping table including some of the plural pieces of mapping information included in the mapping table; and
a control circuit configured to control the memory device,
wherein the control circuit refers to a first piece of mapping information corresponding to first data indicated by a first command, in the partial mapping table, and performs an update for a reference-related parameter of the first piece of mapping information, and
wherein the control circuit refers to a second piece of mapping information corresponding to second data indicated by a second command, in the partial mapping table, and size of the second data is a second size, which is different from a first size of the first data and does not perform an update for a reference-related parameter of the second piece of mapping information,
wherein the first size is smaller than the second size,
wherein the first size is equal to or smaller than a threshold value and the second size exceeds the threshold value,
wherein the control circuit refers to a third piece of mapping information corresponding to third data indicated by a third command and size of the third data is a third size, which is larger than the second size, in the partial mapping table, and does not perform an update for a reference-related parameter of the third piece of mapping information, and
wherein, when the first size is smaller than a first threshold value, the second size is equal to or larger than the first threshold value and is smaller than a second threshold value and the third size is equal to or larger than the second threshold value,
wherein the update of the reference-related parameter of the third piece of mapping information and the update of the reference-related parameter of the second piece of mapping information are not performed at different frequency, and
wherein a frequency that the reference-related parameter of the third piece of mapping information, corresponding to the third data having the third size, is not updated is higher than an frequency that the reference-related parameter of the second piece of mapping information corresponding to the second data having the second size, is not updated.

6. The memory controller according to claim 5, wherein, when the partial mapping table is in a full caching status, the control circuit selects victim mapping information among plural pieces of mapping information included in the partial mapping table, based on reference-related parameters thereof, erases the victim mapping information from the partial mapping table, and caches another piece of mapping information from the mapping table in the partial mapping table.

7. The memory controller according to claim 6, wherein the second piece of mapping information is more likely to be selected as the victim mapping information, than the first piece of mapping information, because the update for the reference-related parameter of the second piece of mapping information is not performed.

8. The memory controller according to claim 5, wherein the reference-related parameter includes at least one of reference history information and reference count information.

9. A method of operating a memory controller for controlling a memory device, comprising:
- caching a partial mapping table including some of plural pieces of mapping information mapping between physical addresses and logical addresses, which are included in a mapping table in the memory device;
- referring to mapping information corresponding to data indicated by a command, in the partial mapping table; and
- controlling an update for a reference-related parameter of the mapping information to be performed or not to be performed, depending on a size of the data,
- wherein, in the controlling, the memory controller performs the update for the reference-related parameter of the mapping information when the size of the data is equal to or smaller than a first threshold value, and does not perform the update for the reference-related parameter of the mapping information when the size of the data is larger than the first threshold value,
- wherein the memory controller refers to a third piece of mapping information corresponding to third data indicated by a third command and size of the third data is a third size, which is larger than the second size, in the partial mapping table, and does not perform an update for a reference-related parameter of the third piece of mapping information, and
- wherein the first size is smaller than a first threshold value, the second size is equal to or larger than the first threshold value and is smaller than a second threshold value, and the third size is equal to or larger than the second threshold value,
- wherein the update of the reference-related parameter of the third piece of mapping information and the update of the reference-related parameter of the second piece of mapping information are not performed at different frequency, and
- wherein a frequency that the reference-related parameter of the third piece of mapping information, corresponding to the third data having the third size, is not updated is higher than a frequency that the reference-related parameter of the second piece of mapping information, corresponding to the second data having the second size, is not updated.

10. The method according to claim 9, wherein the reference-related parameter includes at least one of reference history information and reference count information.

11. The method according to claim 9, further comprising, after the controlling:
- selecting, when the partial mapping table is in a full caching status, victim mapping information among plural pieces of mapping information included in the partial mapping table, based on reference-related parameters thereof;
- erasing the victim mapping information in the partial mapping table; and
- caching another piece of mapping information from the mapping table in the partial mapping table.

12. The method according to claim 11, wherein a possibility of mapping information to be selected as the victim mapping information increases as the mapping information corresponds to data of a larger size.

\* \* \* \* \*